Patented June 14, 1932

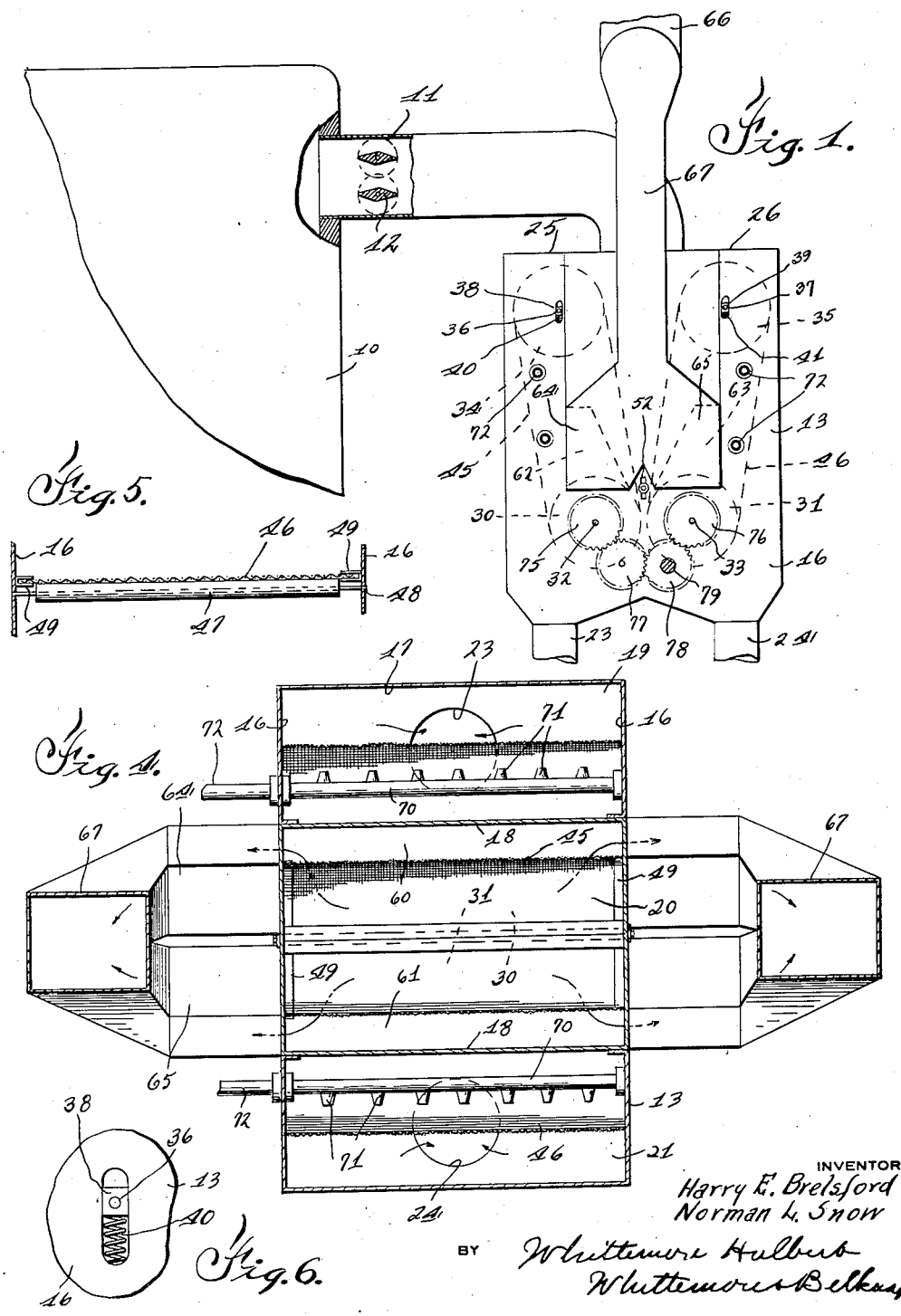

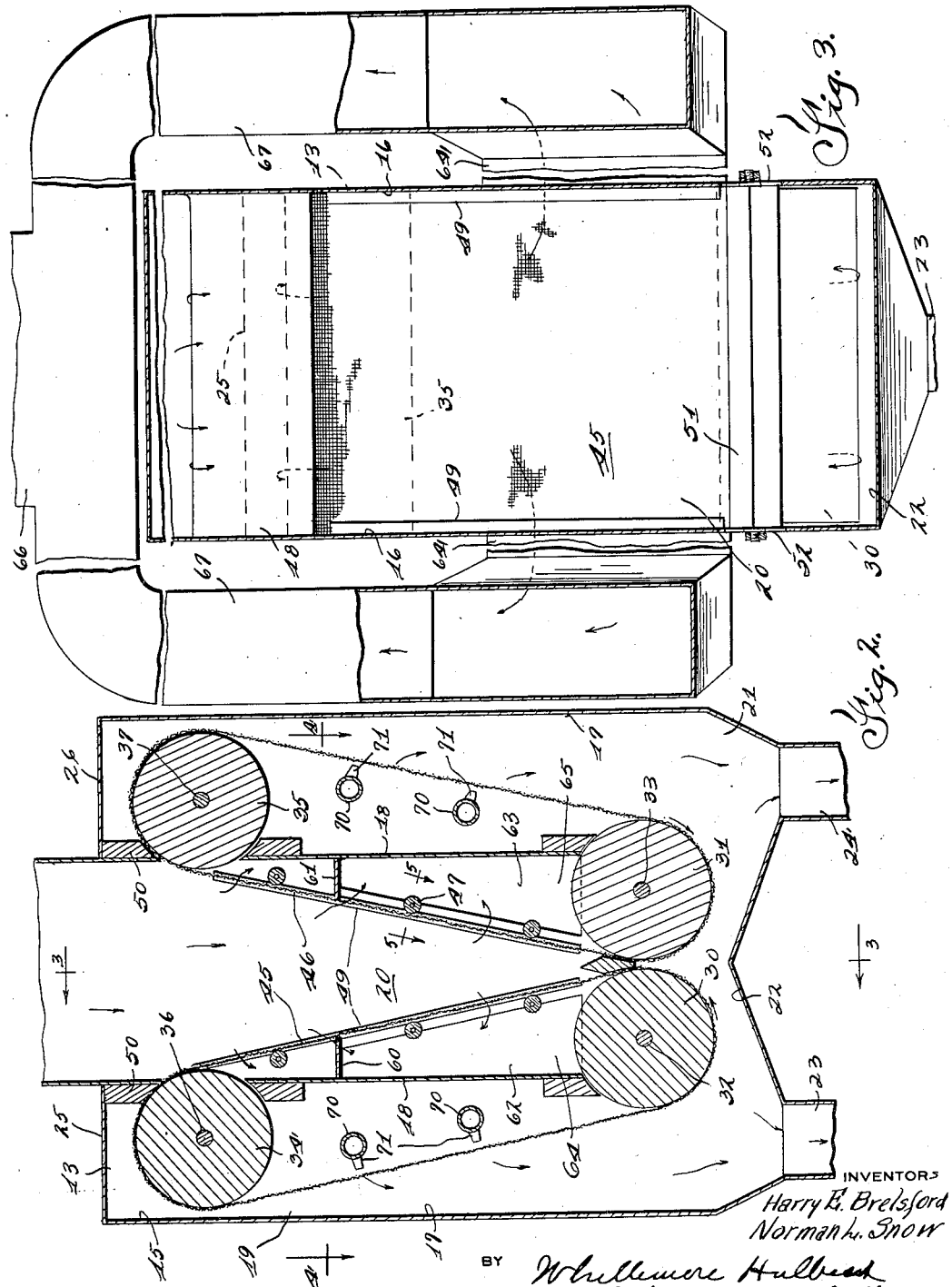

1,862,839

UNITED STATES PATENT OFFICE

HARRY E. BRELSFORD, OF DETROIT, MICHIGAN, AND NORMAN L. SNOW, OF NEW CANAAN, CONNECTICUT, ASSIGNORS TO DIAMOND POWER SPECIALTY CORPORATION, OF DETROIT, MICHIGAN, A CORPORATION OF MICHIGAN

APPARATUS FOR SEPARATING DUST FROM GASES

Application filed December 2, 1929. Serial No. 411,169.

This invention relates to an apparatus for separating dust from gases and has particular reference to an apparatus of this character for removing the ash from furnace gases.

One of the primary objects of this invention is to provide an apparatus of the above mentioned character which will be continuous in operation and which will not retard the free flow of furnace gases in any way whatsoever.

The invention further contemplates the provision of an apparatus by which the method may be carried out, which apparatus will be simple in construction and therefore be capable of being mounted on standard boilers with a minimum of expense.

Other objects and advantages of the invention will become more apparent as the following description proceeds.

In its broader aspects, the method contemplates the steps of flowing the gas to be cleaned through a predetermined passage, causing the gas in its travel through the passage to pass through a suitable screen to remove the particles of dust and ash suspended in the gas and in effecting a continuous cleaning of the screen so that the same will not retard the travel of the gases through the passage. More specifically the method consists in conducting the gases from a furnace or the like through a suitable gas passage, causing the gases as they travel through the passage to pass through an endless screen and in continuously moving the screen across the flow of the gases to constantly present clean surfaces to the gas so as not to obstruct in any way the travel of the gas. At a point remote from the gas passage a cleaning fluid is discharged against the screen to remove the dust collected by the screen, and this dust is collected in suitable hoppers or the like from which it may be conducted to any desired point of use or discard.

While the method as described may be carried out by any one of a number of different apparatuses, there is disclosed in the drawings one embodiment of an apparatus which may be provided for carrying out the method.

Referring then to the drawings,

Figure 1 is a semi-diagrammatic elevational view showing an apparatus constructed in accordance with the teachings of this invention and associated with the gas flue of a boiler.

Figure 2 is a vertical sectional view through the apparatus shown in Figure 1.

Figure 3 is a vertical sectional view on the line 3—3 of Figure 2.

Figure 4 is a horizontal sectional view on the line 4—4 of Figure 2.

Figure 5 is a fragmentary sectional view on the line 5—5 of Figure 2, and

Figure 6 is a detail elevational view of a portion of the structure shown in Figure 1.

In the drawings wherein like reference characters designate corresponding parts throughout all views, the numeral 10 designates a boiler which may be of any desired construction and which is provided, in accordance with the usual practice, with the waste gas flue 11 controlled by suitable dampers 12. The numeral 13 designates generally a dust collector constructed in accordance with the teachings of this invention, this dust collector being mounted adjacent the boiler to receive the gases from the flue 11.

Referring then particularly to Figures 2 to 4, inclusive, of the drawings, it will be noted that the dust collector includes a casing 15 having side walls 16 and end walls 17. Partitions 18 divide the casing into the chambers 19, 20 and 21, these partitions terminating slightly short of the base 22 of the casing, as clearly illustrated in Figure 2 of the drawings. The chambers 19 and 21 are provided at their lower ends with discharge pipes 23 and 24, respectively, and the lower wall 22 of the casing is sloped in opposite directions from the center of the casing to direct ash and the like toward these discharge pipes.

The walls 18 of the chamber 20 are extended upwardly beyond the walls 25 and 26 which close the tops of chambers 19 and 21, respectively, and are connected to the flue 11, as clearly illustrated in Figure 1 of the drawings. Thus gases passing out of the furnace through this flue are directed downwardly through the chamber 20 within the casing 15.

Mounted in the lower end of the chamber 20 are drums 30 and 31 provided with shafts 32 and 33, respectively, rotatably mounted in fixed bearings in the sides of the casing 15. Mounted within the chambers 19 and 21 and adjacent the upper ends of the same are drums 34 and 35 having the shafts 36 and 37, respectively, mounted in bearings 38 and 39 slidably mounted in the walls of the casing 15. Springs 40 and 41 engage the bearings 38 and 39 to urge the same upwardly, as will be clearly apparent by reference to Figure 6 of the drawings.

Extended around the drums 30 and 34 is an endless belt 45 of a fine mesh screen of one or more layers, and a similar belt 46 is extended around the drums 31 and 35. The belts 45 and 46 are so arranged as to extend at an angle from the center of the chamber 20 at the lower end thereof through the sides of this chamber so that all gas passing downwardly through chamber 20 must pass through these belts. Rollers 47 journalled as at 48 in the sides of the casing support the belts against the gas pressure while channel members 49 fixed to the sides of the casing receive the edges of the belts to prevent the gas from passing between the edges of the belt and the walls of the casing.

Where the belt members and rollers pass through the partitions 18, suitable filler blocks 50 are provided which form with the partitions 18 close fitting joints to reduce the leakage of gas from the chamber 20 to the chambers 19 and 21, these filler blocks being preferably curved, as illustrated in Figure 2 of the drawings, to provide an elongated joint. Between the two belts where they pass over the drums 30 and 31, is fitted a bar 51 which normally prevents gas passing downwardly between the two belts. This bar is preferably mounted for movement in slots 52 formed in the sides of the casing whereby if large particles of dust collect at this point the bar may be moved upwardly to permit this accumulated dust to fall downwardly to the base 22 where it will be directed toward the discharge pipes 23 and 24.

Arranged within the chamber 20 are horizontal partitions 60 and 61, the partition 60 extending from the wall 18 laterally to the belt 45 at one side of the chamber 20 and the partition 61 extending from the partition 18 laterally to the belt 46 at the other side of the chamber 20. The partitions 60 and 61 cooperate with the partitions 18, belts 45 and 46 and the upper surfaces of the rollers 30 and 31 to form chambers 62 and 63 on opposite sides of the chamber 20 and adjacent the lower end of this chamber. The chambers 62 and 63 communicate with lateral exhaust passages 64 and 65 arranged on opposite sides of the casing 15 by which the gas, after it has passed through the belts, may be conducted to a suitable stack 66. It will be noted that the exhaust passages 64 and 65 join to form a passage 67, there being one of these passages on each side of the casing 15 and that these passages in turn connect to the stack 66.

Arranged in the chambers 19 and 21 and extending transversely of the same are a plurality of blower elements for discharging cleaning fluid against the belts 45 and 46 to remove from these belts dust and ash carried by the same. Each blower element may, as illustrated in Figure 4 of the drawings, comprise an elongated pipe 70 provided with a plurality of discharge nozzles 71 for directing steam or compressed air toward the belts, each pipe being provided with the desired cleaning fluid by a supply pipe 72 connected to any suitable source of supply not shown. The arrangement is such that the dust and ash blown from the belts will fall downwardly in the chambers 19 and 21 for discharge through the pipes 23 and 24, as clearly illustrated in Figure 2 of the drawings. If desired, water might be supplied to the pipes 70 instead of air or steam to effect a cleaning of the belts, the supply pipes 72 then being connected to any suitable source of water supply.

The drums 30 and 31 are adapted to be rotated in the direction of the arrows in Figure 2 of the drawings, and to accomplish this gears 75 and 76 are fixed to the shafts 32 and 33, respectively. These gears are driven by intermeshing gears 77 and 78, and gear 78 may be mounted on a drive shaft 79 connected to any suitable source of power not shown. The arrangement is such that the drums will be rotated at a sufficient speed to constantly present clean belt surfaces to the flow of gas so that the flow of gas is not obstructed by clogged places in the belt.

From the above it is believed that the structure and operation of the apparatus will be clearly apparent. Dust and ash laden gas from the flue 11 will enter the top of the chamber 20 and will pass downwardly through this chamber and through the belts 45 and 46 to the chambers 62 and 63 from which it will be conducted to the stack 66 by pipes 64, 65 and 67. In passing through the belts, the dust will be removed from the gas and the dust collected on the belts will be carried upwardly and over the tops of the drums 34 and 35 into the chambers 19 and 21. In these chambers the dust and ash will be blown from the belts by the blower elements 70 and will thus be discharged to the pipes 23 and 24. The process will be a continuous one, the drums rotating at such a speed that clean belt surfaces are presented at such a rate that the free flow of gas through the belts is not obstructed and so that the spaces of the belt are not too greatly clogged by accumulations of dust. The springs 40 and 41 will constantly urge the drums 34 and 35 upwardly to take up any slack in the belts 45 and 46 incident to the stretching of these belts when the same become heated by the furnace gases, and the filler blocks 50 will reduce to a considerable extent the escape of gas from the chamber 20 to the chambers 19 and 21.

It will thus be seen that the invention provides an apparatus by which the dust and ash may be efficiently and economically removed from furnace gases by a continuous process which will not require the services of a skilled operator and which may be conveniently associated with any boiler or furnace now in use. While the method and apparatus has been described with considerable detail it is to be clearly understood that the description is for the purposes of illustration only and is not definitive of the limits of the inventive idea, the right being reserved to make such changes in the details of construction and arrangement of parts as will fall within the purview of the attached claims.

What we claim as our invention is:

1. An apparatus for removing ash from furnace gases including in combination a casing divided to form a gas passage and a pair of ash chambers, endless belts of fine mesh material arranged in said casing and extending from said gas passage to said ash chambers, said belts being arranged across the flow of gases through said gas passage and being adapted to collect the ash from said gases, means for moving said belts to carry the ash collected by the same into said ash chambers, and blower elements arranged in said ash chambers for blowing the ash from said belts.

2. An apparatus for removing ash from furnace gases including in combination a gas passage through which said gases are caused to flow, a pair of drums arranged at one end of said gas passage and substantially closing the same, endless belts of fine mesh material engaging said drums and passing through the sides of said gas passage, means for rotating said drums to cause longitudinal travel of said belts across said gas passage whereby the ash in said gases will be collected by said belts and carried out of said passage, and means arranged exteriorly of said gas passage for cleaning said belts.

3. An apparatus for removing ash from furnace gases including in combination a gas passage through which said gases are caused to flow, a pair of rollers substantially closing one end of said gas passage, means including screens mounted on said rollers for movement across said gas passage for removing the ash from the gases as they pass through the said passage, and a bar arranged between said rollers for normally closing the space between the same, said bar being movable to permit the passage between said rollers of large particles removed from the gases.

4. An apparatus for removing ash from furnace gases including in combination a vertical gas passage having an inlet opening at its upper end and having laterally directed outlet openings adjacent its lower end, rollers closing the lower end of said gas passage, and endless screens mounted on said rollers for movement transversely of said gas passage and between the inlet and outlets of said gas passage to remove the dust particles and the like from the gas prior to its discharge from the said passage by way of said outlets.

In testimony whereof I affix my signature.
HARRY E. BRELSFORD.
In testimony whereof I affix my signature.
NORMAN L. SNOW.